(12) United States Patent
Röthemeyer

(10) Patent No.: US 6,854,873 B2
(45) Date of Patent: Feb. 15, 2005

(54) EXTRUDER FOR PROCESSING RUBBER MIXTURES

(75) Inventor: Fritz Röthemeyer, Isernhagen (DE)

(73) Assignee: Berstorff GmbH, Hannover (DE)

( * ) Notice: Subject to any disclaimer, the term of this patent is extended or adjusted under 35 U.S.C. 154(b) by 148 days.

(21) Appl. No.: 10/139,803

(22) Filed: May 6, 2002

(65) Prior Publication Data

US 2002/0180085 A1 Dec. 5, 2002

Related U.S. Application Data

(63) Continuation of application No. PCT/EP00/11131, filed on Nov. 10, 2000.

(30) Foreign Application Priority Data

Nov. 13, 1999 (DE) .......................................... 199 54 653

(51) Int. Cl.⁷ ................................................ B29B 7/34
(52) U.S. Cl. .............................. 366/80; 366/88; 366/89; 425/208
(58) Field of Search ........................... 366/89, 88, 322; 366/80, 77; 425/208

(56) References Cited

U.S. PATENT DOCUMENTS

| | | | | | |
|---|---|---|---|---|---|
| 4,000,884 A | * | 1/1977 | Chung | .......................... | 366/88 |
| 4,240,755 A | * | 12/1980 | Frankland, Jr. | .............. | 366/88 |
| 4,249,877 A | * | 2/1981 | Machen | ....................... | 425/204 |
| 4,285,600 A | * | 8/1981 | Kruder | ......................... | 366/89 |
| 4,341,474 A | * | 7/1982 | Wheeler et al. | .............. | 366/88 |
| 4,365,946 A | | 12/1982 | Anders | | |
| 4,384,837 A | * | 5/1983 | Murai et al. | .................. | 366/89 |
| 4,733,970 A | * | 3/1988 | Yokana | ......................... | 366/89 |
| 4,859,069 A | * | 8/1989 | Geyer | .......................... | 366/77 |
| 4,896,969 A | * | 1/1990 | Dray | ............................ | 366/88 |
| 4,988,281 A | * | 1/1991 | Heathe et al. | ................ | 366/77 |
| 5,071,256 A | * | 12/1991 | Smith et al. | ................... | 366/89 |
| 5,088,914 A | * | 2/1992 | Brambilla | .................... | 366/89 |
| 5,141,326 A | * | 8/1992 | Eshima | ........................ | 366/88 |
| 5,178,458 A | * | 1/1993 | Hsu | ............................. | 366/89 |

FOREIGN PATENT DOCUMENTS

| | | |
|---|---|---|
| DE | 42 35 430 A | 4/1994 |
| EP | 0 798 097 A | 10/1997 |

* cited by examiner

Primary Examiner—Tony G. Soohoo
(74) Attorney, Agent, or Firm—Henry M. Feiereisen; Ursula B. Day

(57) ABSTRACT

The invention relates to an extruder for the preparation of rubber mixtures for elastomeric products and comprises a cylinder, an endless screw rotatably mounted in the cylinder for uptake transport and homogenization of the rubber mixture, and an extrusion tool; wherein the endless screw is configured with zones of multiple treads in dependence of varying helix angle and depth of thread so that the rubber mixture transported through the zones undergoes a temperature increase through heat dissipation to such an extent that the temperature of the extrudate approaches the vulcanization temperature thereof.

10 Claims, 3 Drawing Sheets

EXTRUDER FOR PROCESSING RUBBER MIXTURES

CROSS-REFERENCES TO RELATED APPLICATIONS

This application is a continuation of prior filed copending PCT International application no. PCT/EP00/11131, filed Nov. 10, 2000.

This application claims the priority of German Patent Application Serial No. 199 54 653.3, filed Nov. 13, 1999, pursuant to 35 U.S.C. 119(a)-(d), the subject matter of which is incorporated herein by reference.

BACKGROUND OF THE INVENTION

The present invention relates generally to an extruder and a method for processing rubber mixtures, and in particular an extruder for producing elastomeric products including elastomeric extruded profiles and a method for processing rubber mixtures for the production of elastomeric products.

When producing elastomeric products by extrusion, it is particularly desirable to realize a substantially uniform degree of crosslinking in the rubber mixture during the vulcanizing process. The uniform degree of crosslinking serves as a means of ensuring the quality of the elastomeric product. To realize the substantially uniform degree of crosslinking, the difference in temperature between the extruded product and the temperature of the vulcanizing medium should thus be kept small. In practice, the temperature of the extrusion product when leaving the extruder should be increased from an initial starting temperature of about 70–100° C. to a level of about 130–180° C. at the start of the vulcanizing process.

In the prior art, a shear head method is used to increase the temperature of the extrudate, wherein the temperature increase is realized through the mechanical force of a rotating shear mandrill.

In another possible method of the prior art, UHF technology can be employed. However, application of the UHF technology requires a complex recipe composition for the rubber mixture, particularly for mixtures that are using nonpolar EPDM-polymers as a basis.

From EP 798 097, an extruder is known the prior art, which is provided with a throttle driven by a back coupling control that starts from a specified temperature, density and weight of the exiting extrudate. This throttle comprises single mandrills that are projecting from the outside radially into the cylinder wall of the extruder and is driven by a cam ring located exteriorly. By varying the length of projection of these mandrills into the interior of the extruder, the shearing resistance, which is impacting on the extrudate is adjustable in continuous manner. The desired extrusion temperature can thus be controlled in dependence on the operation parameters. This arrangement is a very elaborate system, which requires not only a special extrusion cylinder, through which the engagement of the mandrills is controlled from the outside, but in addition requires a specially designed screw.

While this apparatus is designed to maintain a desired optimal temperature of the extrudate, nothing is disclosed about whether the vulcanizing temperature should be reached.

Furthermore, apparatuses are known, wherein a shear head is coupled in fixed rotative engagement with the screw, while the housing, which surrounds the extrusion cylinder in a sealing manner, is rotatable in a direction opposite that of the rotational direction of the screw. By means of the continuously adjustable rotational speed of the housing, the shear forces acting upon the extrudate and thus influencing its temperature can thus be affected in a purposeful manner. In U.S. Pat. No. 4,365,946, this method is used to increase the temperature of a rubber mixture to the vulcanizing temperature.

One of the drawbacks of the afore-described apparatuses is their complex assembly and also the need that the elements which are provided to increase the temperature of the extrudate require a toothed configuration, which would therefore prevent the reconfiguration of already existing extruders.

It would therefore be desirable and advantageous to obviate these prior art shortcomings and to provide an extruder with an extruder endless screw of an improved configuration and a method designed for increasing the temperature of the rubber mixture for the elastomeric profile sections to approximate the temperature to that of the vulcanizing temperature in order to obtain a uniform crosslinking of the rubber in the elastomeric sections.

SUMMARY OF THE INVENTION

The present invention resolves prior art problems of extruders for processing rubber mixtures for elastomeric products, in particular those produced by a continuous process, of the type having a cylinder and a screw rotatably supported in the cylinder for drawing, conveying and homogenizing the rubber mixture; and an extrusion head comprising an extrusion tool.

In accordance with one aspect of the invention, the endless screw supported in the cylinder is configured in such a way that the rubber mixture, during transport through the extruder and before reaching the extrusion tool, undergoes an increase in temperature through heat dissipation, such that the temperature of the extrudate approaches the vulcanizing temperature, which is desired for a cross linking in the extrudate.

The advantage provided by the invention is that it obviates the need for complex installations designed for increasing the temperature after the extrudate leaves the extruder, such as a shear head-or an UHF installation.

According to one feature of an exemplary embodiment of the invention, the extruder screw is configured having multiple threads configured in dependence on the diameter of the screw, wherein the number of threads increases with the diameter of the screw. Preferably, the helix angle and the thread depth of the screw are of dimensions selected in such a way that an increase in pressure in the screw entry zone of the extruder which is followed by a pressure constant or a pressure drop in screw the exit zone, can be realized.

For this purpose, an extruder screw, for example, a screw of low capacity can be configured with the helix angle φ of the screw having a small rising helix (p in the exit zone, preferably in the range of about 7°–14°.

Alternative to, or in combination with the afore-described configuration of a small rising helix angle φ it may be possible to provide the exit zone of the extruder with a shallow depth of thread H. A dimension of the depth of thread H of less than 0.15 times the diameter of the screw has proven to be an advantageous choice.

In order to adjust the temperature in the cylinder, in particular, the temperature in the exit zone of the extruder to a level required for controlling the process, without affecting the entry zone, it is possible to assemble the extruder cylinder from several subunits, which are thermally separated from each other by insulation rings.

As a further feature of the invention, the extrusion head of the extruder is provided with a pressure piece designed to further increase the mixing temperature of the rubber mixture in the channel of the screw as well as in the extrusion head by means of adjusting, or respectively increasing the pressure and to reduce the median residence time at higher mixing temperatures.

In another aspect of the invention, the process for processing rubber mixtures in a screw extruder in preparation for producing elastomeric products, in particular for producing elastomeric section profiles, the rubber mixture is taken up in the extruder where it is mixed, plasticized and formed in an extrusion tool into the desired shape suitable for a particular purpose. Thereafter the extrudate undergoes a vulcanizing process, wherein heat is supplied to the extrudate to increase the temperature. In accordance with the invention, the rubber mixture is essentially continually heated throughout its conveyance through the extruder so that the extrudate, after exiting the extruder, has a temperature which approaches already that of the vulcanizing process.

In accordance with an advantageous embodiment of the invention, the temperature increase of the extrudate which approaches the temperature of the vulcanizing process is realized by an extruder screw so dimensioned as to effect an increase of temperature in the rubber mixture by way of heat dissipation.

Preferably, the heat dissipation in the rubber mixture is realized by increasing the screw speed at a comparatively low output.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
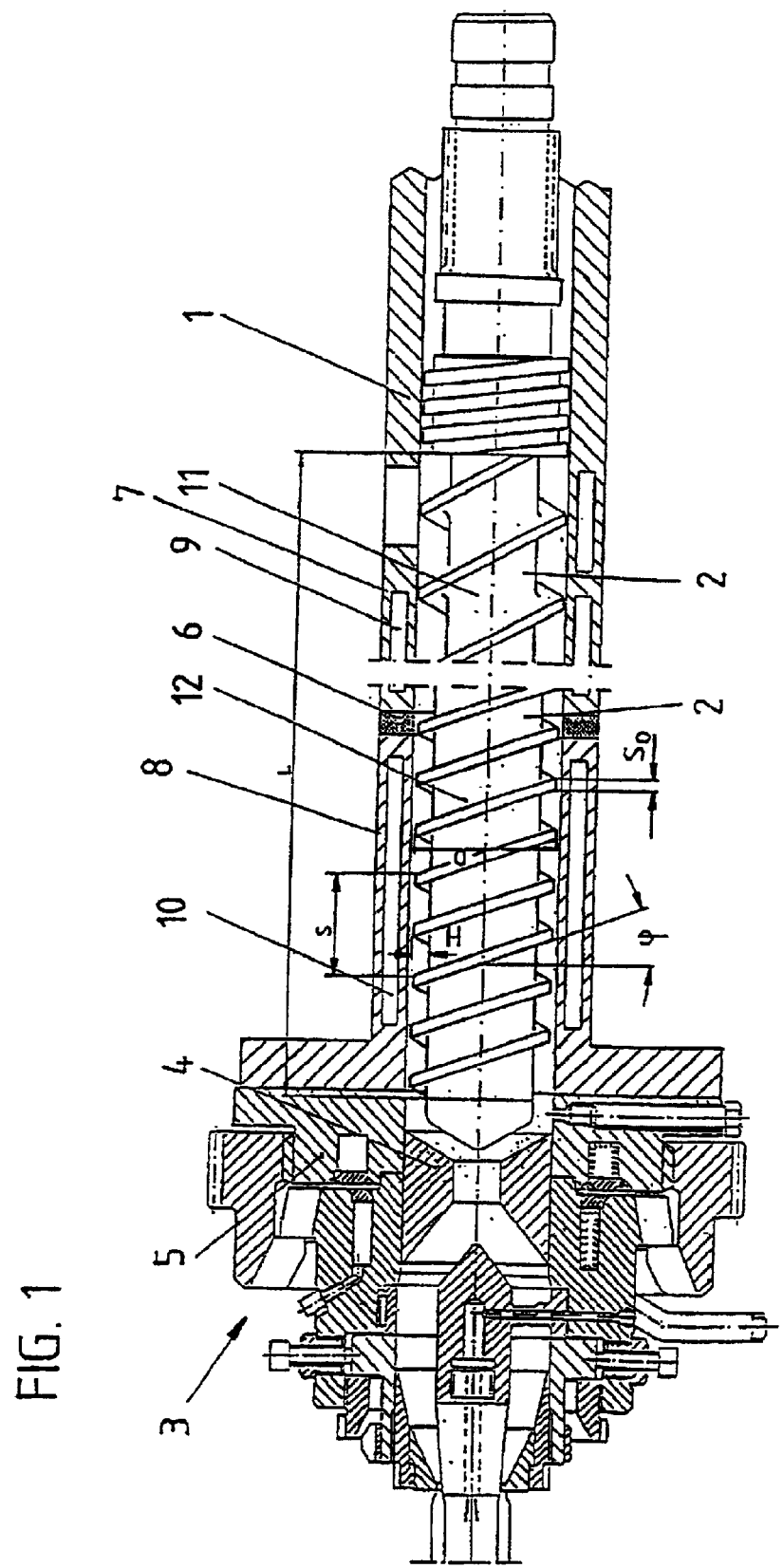
FIG. 1 shows an extruder with a screw configured according to the present invention.

Throughout all the Figures, same or corresponding elements are generally indicated by same reference numerals.

Turning now to the drawing, and in particular to FIG. 1, there is shown an extruder 1 comprising essentially a cylinder 1, a screw 2 rotatably disposed in cylinder 1 and an extrusion head 3 with a pressure piece 4 inserted therein and an extrusion tool 5.

The cylinder 1 is divided by means of an insulation ring 6 into a cylinder entry zone 7 and a cylinder exit zone 8 and the cylinder further shows the hollow spaces 9 and 10 for temperature equalization.

The parameters as used herein are as follows: wherein diameter D denotes the diameter of the extruder screw; length L the length of the homogenizing zone; the screw channel width B; the lead of screw flight S; the helix angle $\phi$ the width of the flight land S; the number of threads m; the surface A; the volume V; the volumetric rate of discharge Q.

The screw has a screw entry zone 11 and a screw exit zone 12, which differ from each other by the dimension of their helix angle $\phi$ and the depth of their threads H. Thus, the screw exit zone 12 has a smaller helix angle $\phi$, namely about 7–14° and a smaller depth of thread H when compared to the screw entry zone 11.

In combination with the inserted pressure piece 4 and the extruder head 3, which is configured for efficient flow, it is possible to adjust or respectively increase the pressure in the screw channel as well as in the extruder head 3 by means of conversion of the pressure energy and a reduction of the median residence time of the mixture in the extruder at elevated mixture temperatures.

During operation of the extruder, the rubber mixture is conveyed from the entry zone 11 of the screw 2 in the direction of exit zone 12 of the screw, so that by selecting the dimension of the helix angle $\phi$ and the thread depth H according to the invention, a higher pressure is present in the cylinder entry zone 7 then in the cylinder exit zone 8, to thereby reduce the pressure and leakage flow, which leads to an improved thermal control of the process.

Furthermore, due to the increase in the surface to volume ratio in the exit zone 12 according to the invention, the mixing temperature in the wall areas where the slower flow occurs, can be relatively precisely controlled.

The following is a table of exemplary dimensions of a screw 2 according to the invention, with which the afore-described effects are realized:

TABLE 1

| Parameter\screw zones | Dim | entry zone | exit zone |
| --- | --- | --- | --- |
| Diameter D | mm | 60 | 60 |
| Length L | mm | 420 | 300 |
| Depth of Thread H | mm | 8 | 5 |
| Channel width B | mm | 15.4 | 18.6 |
| Lead S | mm | 40.0 | 47.0 |
| Helix angle $\phi$ | ° | 12 | 14 |
| Land width $S_0$ | mm | 4 | 4 |
| Number of threads $m_0$ | — | 2 | 2 |
| Surface A | $cm^2$ | 2,230 | 1,379 |
| Volume V | $cm^3$ | 498 | 231 |
| A/V | $cm^{-1}$ | 4.5 | 6.0 |
| t (Q = 50/h) | min | 0.60 | 0.28 |

Figure 2:
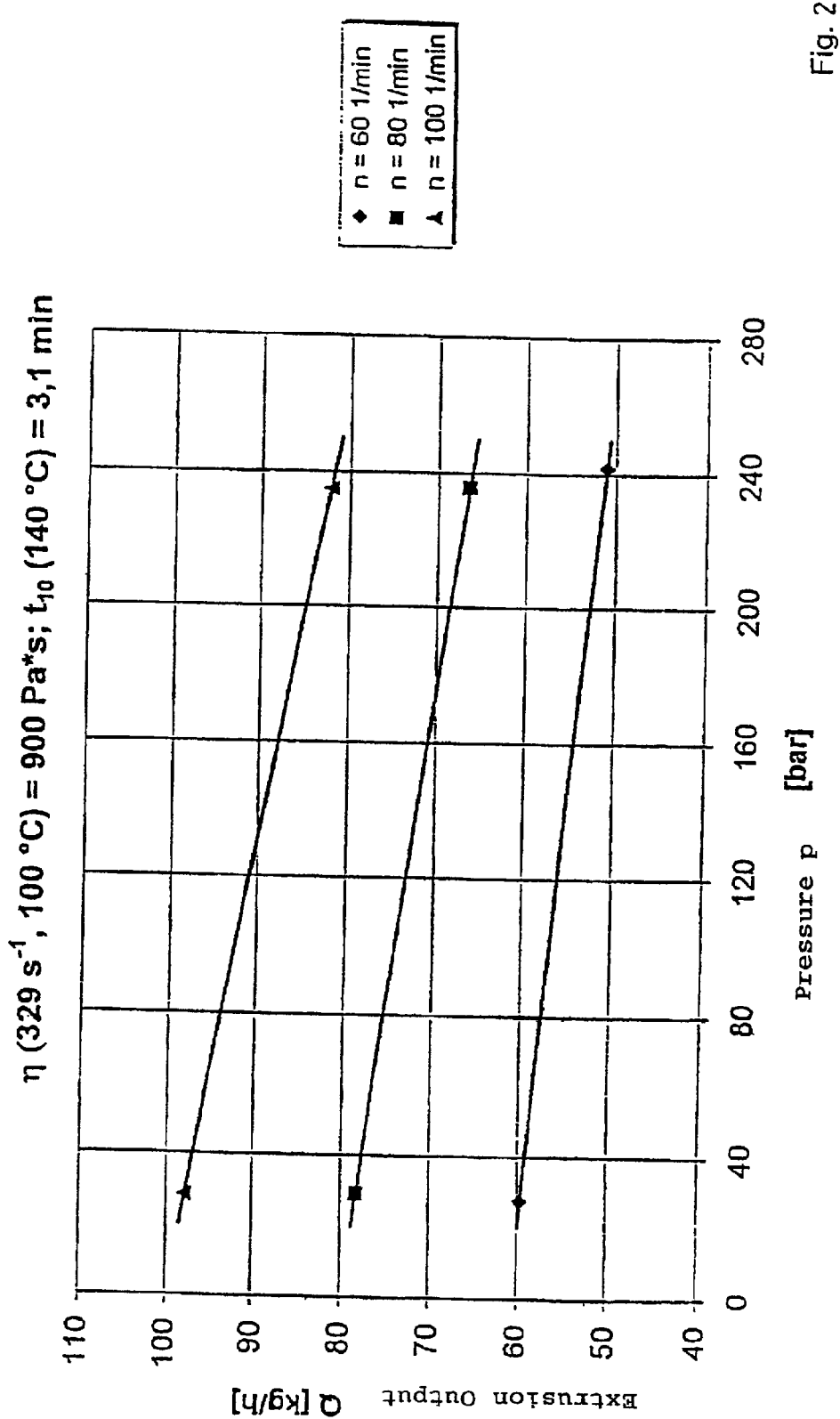
FIG. 2 shows a characteristic diagram of the screw according to FIG. 1.

FIG. 2 shows a diagram of this type of screw 2, which illustrates the transport output relative to the pressure in form of a chart. The rubber mixture used in the graph was a mixture based on EPDM. As seen in FIG. 2, the characteristic lines relate to the various screw speeds of screw 2. The desired level of crosslinking in the rubber mixture should be adjusted such that a linkage of 10 percent at 140° after more than three minutes is realized.

Figure 3:
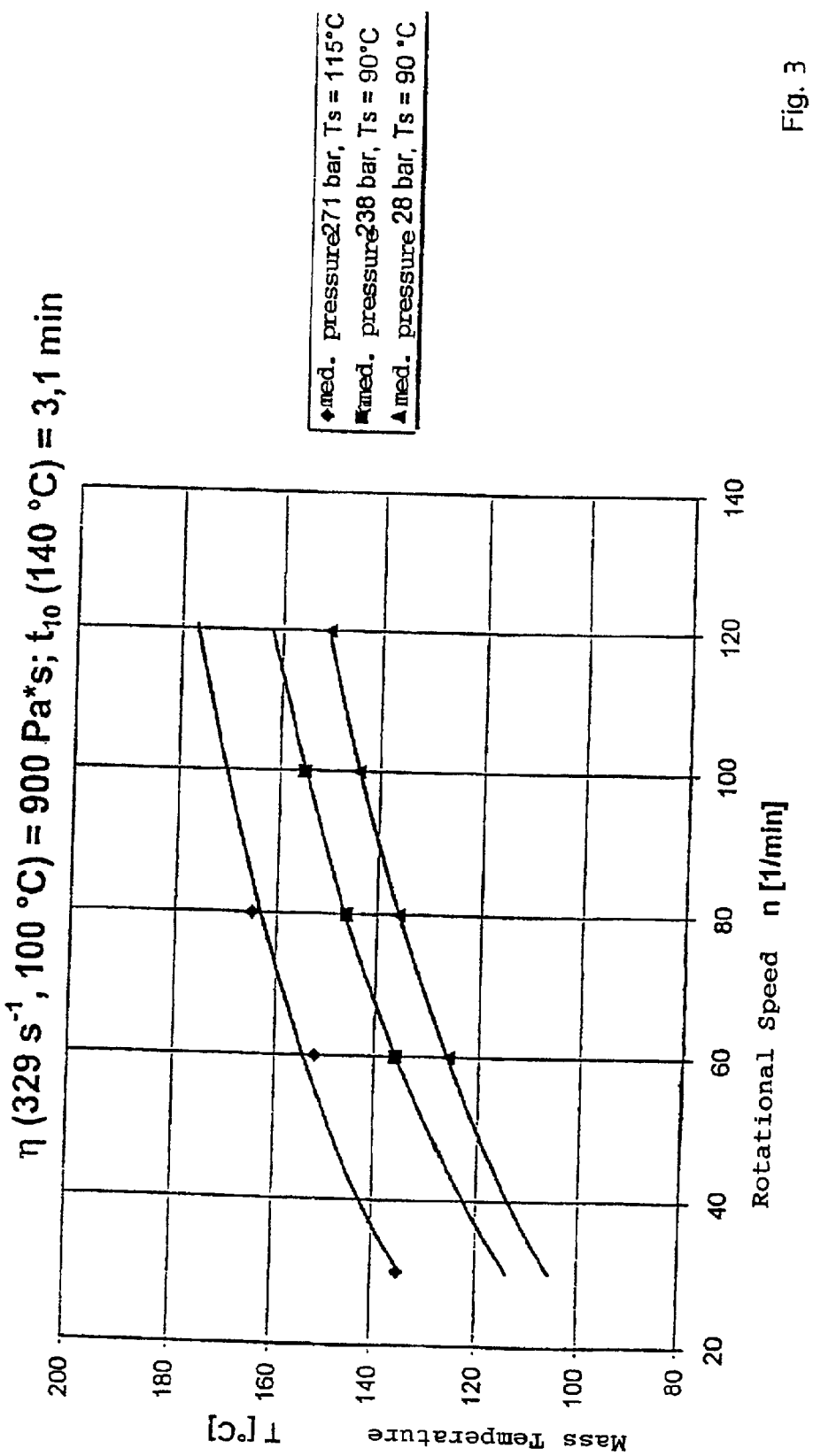
FIG. 3 shows a graphic representation of attainable temperatures of the extruder in stationary operating condition.

The mass temperature that can be reached during operation of the extruder with the screw 2 configured according to the invention, are in dependence of the screw speed of screw 2 at different pressures and temperatures of a rubber mixture based on EPDM as shown in FIG. 3.

While the invention has been illustrated and described as embodied in an extruder for processing rubber mixtures, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An extruder for processing a rubber mixture, comprising:
   a cylinder;
   a screw rotatably supported in the cylinder for uptake, transport, mixing and extruding a rubber mixture; and
   a head with incorporated extrusion tool,
   wherein the screw for advancing a rubber mixture to the extrusion tool has a longitudinal dimension extending from a screw entry zone to a screw exit zone and defined by a helix angle and a thread depth, wherein the dimension varies from the screw entry zone to the screw exit zone so that a rise of the helix angle and the depth of thread are decreasing across the longitudinal dimension from the screw entry zone to the screw exit zone thereby increasing pressure on the advancing rubber mixture near the entry zone, wherein the increased pressure on the advancing rubber mixture has a heat dissipation effect so that the rubber mixture is subjected to a temperature rise during advance to the extrusion tool as a consequence of the heat dissipation and at a constant or decreasing pressure, whereby an extrudate can be obtained at a temperature which approximates a vulcanizing temperature for the extrudate.

2. The extruder of claim 1, wherein the screw is a multithread screw with the number of threads increasing as a root diameter of the screw increases along the longitudinal dimension from the entry zone to the exit zone.

3. The extruder of claim 1, wherein the screw in the exit zone is configured as a screw of minimum output with a helix angle $\phi$ below 14°.

4. The extruder of claim 3, wherein the helix angle $\phi$ in the exit zone is about 7°–14°.

5. The extruder of claim 1, wherein the screw exhibits a thread depth in the exit zone which is less than 0.15×a root diameter of the screw in the exit zone.

6. The extruder of claim 1, and further comprising an insulation ring, wherein the cylinder includes at least two subassemblies which are separated from each other by the insulation ring to thermal de-coupling of the subassemblies.

7. The extruder of claim 1, and further comprising a pressure piece inserted in the head for reducing a free volume and for optional pressure increase.

8. A method for processing a rubber mixture in a screw extruder for production of elastomeric products for subsequent plasticizing and shaping into a desired extrudate, comprising the steps of:
   feeding the rubber mixture to an extruder for subsequent exposure to a vulcanizing process, by advancing the rubber mixture in the extruder by an extruder screw extending from a screw entry zone under increasing pressure in a direction of a screw exit zone in which the rubber mixture is advanced at a constant or decreasing pressure, wherein the dimension of the screw includes a helix angle and a depth of thread of the screw selected in such a way that the helix angle and the depth of thread are decreasing over an extension form the entry zone to the exit zone to thereby continuously increase the temperature of the rubber mixture; so that the extrudate exits the extruder at a temperature which approximates a vulcanizing temperature of the extrudate.

9. The method of claim 8, and further comprising the step of increasing the screw speed to increase the temperature of the rubber mixture while retaining a low output of extrudate.

10. An extruder for processing a rubber mixture, comprising:
   a cylinder;
   a screw rotatably supported in the cylinder for uptake, transport, mixing and extruding a rubber mixture; and
   a head with incorporated extrusion tool, wherein the screw for advancing a rubber mixture to the extrusion tool has a longitudinal dimension extending from a screw entry zone to a screw exit zone and defined by a helix angle and a thread depth, wherein the dimension varies from the screw entry zone to the screw exit zone so that a rise of the helix angle and the depth of thread are decreasing across the longitudinal dimension from the screw entry zone to the screw exit zone thereby causing an increase in pressure on the advancing rubber mixture, wherein the increased pressure on the advancing rubber mixture has a heat dissipation effect so that the rubber mixture is subjected to a temperature rise during advance to the extrusion tool as a consequence of the heat dissipation, whereby an extrudate can be obtained at a temperature which approximates a vulcanizing temperature for the extrudate, wherein a pressure piece is inserted in the head for reducing a free extrudate volume and for optional pressure increase.

* * * * *